June 28, 1960 T. R. DUNCAN 2,942,889
PHONOGRAPH DEVICE
Filed Oct. 29, 1954 2 Sheets-Sheet 1

INVENTOR
THEODORE R. DUNCAN
BY
Mason & Graham
ATTORNEYS

June 28, 1960  T. R. DUNCAN  2,942,889
PHONOGRAPH DEVICE
Filed Oct. 29, 1954  2 Sheets-Sheet 2

INVENTOR
THEODORE R. DUNCAN
BY
Mason & Graham
ATTORNEYS

United States Patent Office 2,942,889
Patented June 28, 1960

2,942,889
PHONOGRAPH DEVICE

Theodore R. Duncan, North Hollywood, Calif., assignor of twenty-six percent to Golda A. Duncan, twenty-four percent to Theodore Roger Duncan and twenty-four percent to Alan C. Duncan, all of North Hollywood, Calif.

Filed Oct. 29, 1954, Ser. No. 465,548

4 Claims. (Cl. 274—26)

This invention has to do with phonographic mechanisms employing mechanical sound pickup means and the invention set forth herein represents an improvement upon that disclosed in my copending application for patent, Serial No. 348,515, filed April 13, 1953, entitled "Phonograph and Tone Arm."

The type of phonograph set forth in my copending application, referred to above, embodies a generally L-shaped mechanical sound pickup and amplification member specifically shown as formed of sheet metal, although the invention is not so limited. A sheet metal member has the disadvantage of requiring multi-stage dies which are initially expensive and usually entail replacement or repair. Another difficulty with a metal pickup member is that of rigidly supporting the needle which tends to come loose under the influence of the vibrations to which the parts are subjected. Metal pickup members sometimes also have the disadvantage of producing an undesirable hissing or screeching noise. This may be caused by the fact that the member tends to vibrate like a reed. It may also be caused by flexure of the member back and forth in a plane normal to the record as the member resists being pulled forward by the needle which tends to be pulled by the rotating record.

It, therefore, is a primary object of my invention to provide an improved form of mechanical sound pickup and amplification member which overcomes the above-noted disadvantages of sheet metal pickup members heretofore used and one which has several advantageous features inherent in its construction.

A particular object of the invention is to provide a sound pickup member which, in quantity, can be produced very inexpensively.

Another object is to provide an improved means of mounting the phonograph needle in the pickup member so that there is a rigid engagement of the member and needle to insure perfect transmission of the oscillations or vibrations of the needle to the pickup member and to insure against the possibility of the needle working loose under the constant vibration to which it is subjected.

Still another object is to provide a vibration-free torsion member for the pickup member or tone arm which prevents the member tending to vibrate like a reed, with the production of unwanted sound.

Still another object is to provide a sound pickup member or tone arm which does not have the objectionable forward and backward flexure action of some prior devices caused by the tendency of the record to pull the needle forward and the tendency of the arm to react against this and spring back.

Yet another object is to provide a tone arm which gives relatively high fidelity reproduction at low cost, particularly one in which there is a notable improvement in response to frequencies above 3,000 cycles per second.

A further object is to provide a sound pickup member which will readily follow the grooves of the record and progress radially inwardly of the record.

Another object is to provide an improved type of case construction enabling the case to be completely sealed and made waterproof.

Still another object is to provide novel and improved means for mounting a sound pickup member.

These and other objects will be apparent from the drawings and from the description which follows.

Referring to the drawings.

Figure 1:
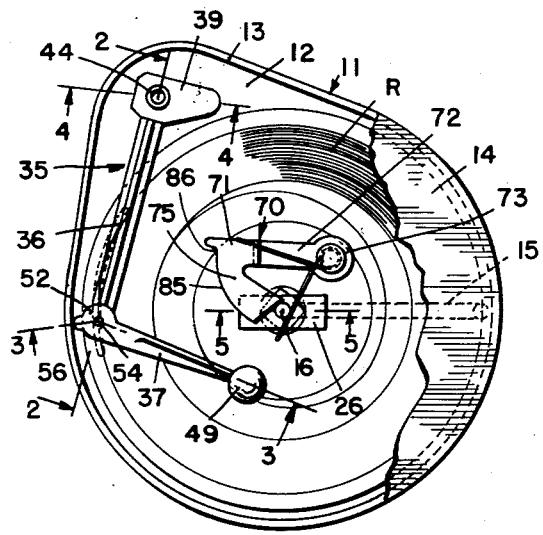
Fig. 1 is a plan view with the cover partially broken away showing a device embodying the invention.
Figure 4:
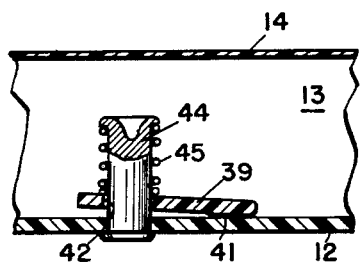
Fig. 4 is an enlarged fragmentary sectional view on line 4—4 of Fig. 1.
Figure 2:
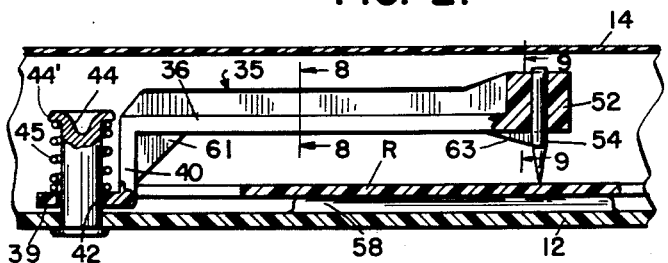
Fig. 2 is an enlarged fragmentary sectional view on line 2—2 of Fig. 1.
Figure 5:
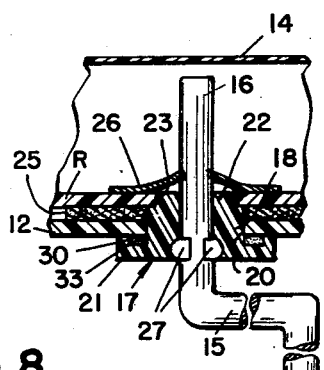
Fig. 5 is an enlarged fragmentary sectional view on line 5—5 of Fig. 1.
Figure 6:
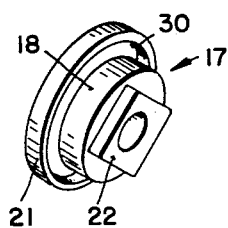
Fig. 6 is a perspective view of the bushing or record-supporting member.
Figure 7:
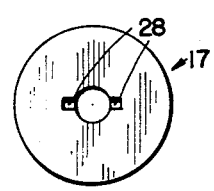
Fig. 7 is a view of the outer end of the bushing of Fig. 6.
Figure 9:
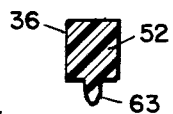
Fig. 9 is a sectional view on line 9—9 of Fig. 2.
Figure 15:
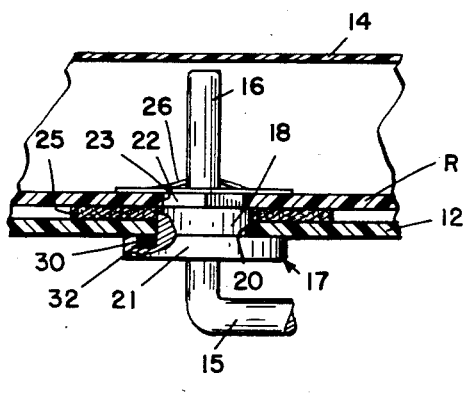
Fig. 15 is a fragmentary sectional view like Fig. 5 but showing a seal means associated with the bushing.

More particularly describing the invention, the device illustrated includes a case 11 having a bottom wall 12, side wall 13, and top wall 14. These parts are preferably made of a suitable plastic, such as styrene, although other materials are suitable. Inside the case I mount a phonograph record R for rotation by a crank 15. The latter is shown as comprising a wire rod terminating at one end in a shaft 16 which carries an annular record-supporting member or bushing 17 (Fig. 6). The latter has a central cylindrical portion 18 which is journaled in a hole 20 in the bottom wall of the case. Outwardly of the case is a flange portion 21. At the inner end of member 17 is a squared portion 22 which is received in a square opening 23 at the center of the record. A spacing washer 25 is provided between the record and the wall of the case. A tinnerman washer-type fastener 26 secures the parts. Interengaging means are provided on the crank and member 17 to lock the parts against rotation, such as the projections 27 on the crank and two recesses 28 in member 17. The bushing 17 is formed to provide an axially extending recess 30 on the inner side of the flange 21. This may be used to house a seal member, such as an O ring or the like 32 (Fig. 15). If no seal is required, the recessed portion or groove may be filled with a suitable lubricant 33 (Fig. 5).

A particular feature of the invention is the sound pickup member, generally indicated by 35. I prefer to form this of a lightweight, moldable substance, such as a relatively hard plastic, and I have found styrene-type plastic eminently suited for the purpose. This member includes a main arm 36 and a lever arm 37. The former is stepped at one end and includes a base 39 and connecting portion 40. The base has a projection 41 on its under surface to reduce friction between it and the case as the member pivots in operation. The base 39 is provided with an oversize opening 42 which loosely receives a rivet 44 or the like upon which the pickup member can pivot. A compression spring 45 is interposed between the inner end 44' of the rivet and the base of the pickup member. The connection means described permits limited tilting or rocking movement of the arm in planes normal to the plane of the surface of the record as well as permitting pivotal movement about the axis of the rivet.

The sound pickup member 35 has the integral lever arm 37 extending from the end of the main arm 36. The lever arm terminates in an end portion 48 having a relatively smooth and preferably convex, upper bearing surface 49 for sliding engagement with the under surface of the upper wall 14 of the case which acts as a sound diaphragm. The parts have been shown in assembled position with the sound pickup member stressed as will later appear; however, it should be noted that the lever arm when unrestrained by the wall 14 does not lie in a plane parallel to the general plane of the base 39 of the main arm but is inclined upwardly with respect thereto as best shown by the broken-line position of the lever arm in Fig. 3.

At the end of the main arm I provide a relatively large and thick section 52 with a bore 53 therein to receive a needle 54 of metal, preferably steel. The bore 53 is made smaller in diameter than the diameter of the needle and the needle is driven therein. For a needle having a diameter of .057" to .058", the hole in the sound pickup member should be about .002" to .0025" smaller in diameter for a plastic, such as styrene. When the needle is driven in, apparently the plastic around it is compressed and thus faithfully transmits the vibrations of the needle. Due to the coefficiency of fatigue memory of the plastic, it will firmly grip the needle throughout the life of the product.

I believe it is extremely important with plastics that the needle be so mounted that the plastic around it be stressed in a condition of compression in order to achieve high-fidelity reproduction and loudness.

Figure 3:
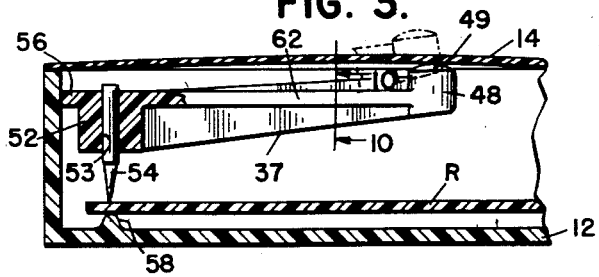
Fig. 3 is an enlarged fragmentary sectional view on line 3—3 of Fig. 1.

At the outer or free end of the main arm of the pickup member I provide a laterally extending projection 56 to limit movement of the member radially outward of the record, the projection being designed to engage the side wall 13 of the case as shown in Fig. 3.

Since the needle is in pressure engagement with the record, I prefer to provide an arcuate rib 58 on the inner side of the bottom wall of the case in the region of the needle to form a bearing or support for the record in this region. The upper edge of the rib may be rounded as shown to reduce friction.

In the assembly of the device, the last step is the cementing of the top wall or diaphragm 14 to the case. In doing this, the diaphragm should be held flat against the pressure of the sound pickup member, which is stressed between the diaphragm and the record, until the cement has firmly set. Subsequently, with the diaphragm firmly attached to the edge of the side wall 13 of the case, whatever means are used to hold the diaphragm flat may be removed. The diaphragm will then be bowed outwardly slightly by the pressure of the sound pickup member, flexing the side wall 13 to some extent. The latter then tends to act as a spring to return the diaphragm to a flat condition with the result that the diaphragm remains taut and slightly bowed. The diaphragm thus readily responds to the half-cycle downward movements of the end of the lever arm as well as to the half-cycle upward movements thereof.

In the operation, assuming the record to be one in which the sound vibrations are cut in the record groove by lateral movement of the cutting stylus, the needle following the groove vibrates laterally at its tip end and these vibrations are directly transmitted to the sound pickup member to cause the end of the lever arm to move up and down translating the lateral oscillations of the needle into vertical movements which are directly transmitted to the diaphragm to produce sound.

Figure 8:
Fig. 8 is a sectional view through the sound pickup member on line 8—8 of Fig. 2.
Figure 10:
Fig. 10 is a sectional view through the sound pickup member on line 10—10 of Fig. 3.

In order to impart stiffness to the main arm and thereby prevent its flexing in a vertical plane under the influence of the friction between the needle and the record and to prevent any tendency of the main arm to vibrate as a reed, and yet have a relatively low cross-sectional mass, I prefer to form the main arm to be T-shaped in cross section as best shown in Fig. 8. Also, I provide a buttress or a stiffening web 61 between the main portion of the main arm and the portion 40. The lever arm is also made relatively rigid by providing a lateral rib portion 62 as best shown in Figs. 3 and 10.

At the forward or free end of the main arm I provide an inclined cam portion 63 which is preferably provided with a rounded or beveled edge. As will later appear, this is used in conjunction with the return or repeat mechanism, indicated generally by numeral 70.

The repeat mechanism, which is shown and described in my copending application for patent on "Phonograph Repeat Mechanism," Serial No. 360,984, filed June 11, 1953, includes a spring-biased lever 71 having a base 72 apertured at its end to receive a mounting pin or rivet 73 secured in the record R. To minimize friction between the record and the lever, I provide a rounded projection 72' on the under side of the lever 72. The lever is stepped in the region 74 and provided with a needle-engaging portion 75 disposed in a plane above portion 72 and such that its longitudinal axis forms an acute angle with portion 72. Lever 71 is yieldably urged to a normal position such that the end of portion 75 engages the shaft 16 of the crank by wire spring 79 having legs 80 and 81 and one or more turns 82 intermediate the legs around the mounting rivet 73. Leg 80 of the spring bears against the shaft 16 (or it may be anchored under the record-holding washer 25) and the other leg of the spring bears against the stepped portion 74 of lever 71. The latter has a convexly arcuate forward edge portion 85 and recessed edge portion 86, the latter being for engagement with the cam portion 63 of the sound pickup member and the needle.

Figure 11:
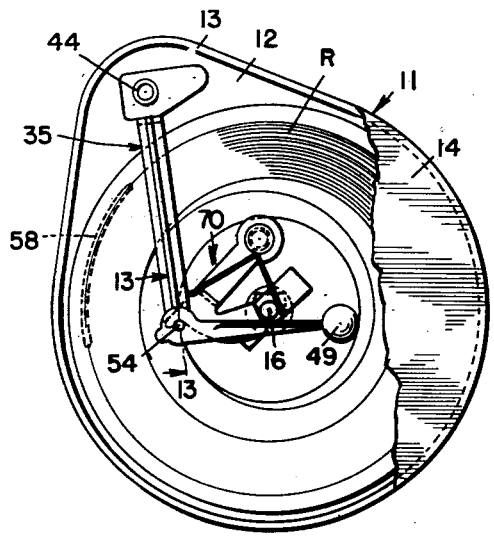
Fig. 11 is a view similar to Fig. 1 but showing the parts in a different position.
Figure 12:
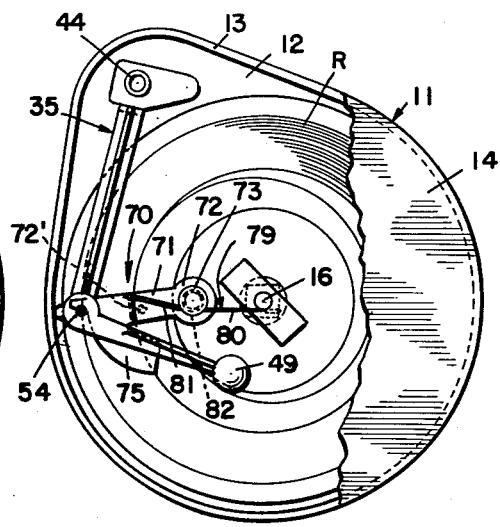
Fig. 12 is a view similar to Fig. 11 but showing the return action of the repeat mechanism.
Figure 13:
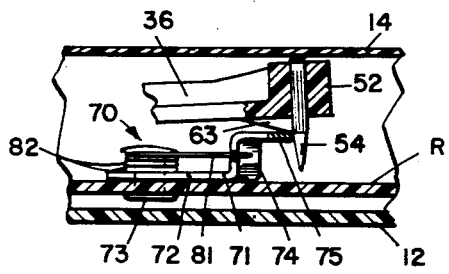
Fig. 13 is an enlarged fragmentary sectional view on line 13—13 of Fig. 11.

In the operation of the device, lever 71 and associated parts rotate with the record. When the needle of the sound pickup member progresses inwardly into the path of the lever, the edge portion 86 of lever 71 engages the cam portion 63 adjacent the needle raising the sound pickup member to elevate the needle off the record and subsequently engages the needle as shown in Fig. 13. Further rotation of the record causes the lever to swing outwardly from the position of Fig. 11 to that of Fig. 12, returning the needle to the outer groove of the record. As the record rotates a few more degrees from the position of Fig. 12, it releases the needle and the lever 71 returns to the original position of Fig. 11 under the influence of the spring. The rounded or beveled under edge of the cam portion 63 facilitates release of the lever from the sound pickup member.

It should be noted that undue inward movement of the sound pickup member is limited by shaft 16 which will be engaged by the lever arm of the member.

One of the features of the lever 71 is that, should the record be rotated in a reverse direction with the needle in the path of the lever 71, no harm will result, since the lever will sweep the needle and sound pickup member outwardly.

Where the substances used for the sound pickup member and the case are all plastic, it is preferable to provide some lubricant between the parts, namely between the base of the sound pickup member and the bottom of the case, between the record and the rib 58 in the case and between the end 48 of the lever arm 37 and the diaphragm.

Figure 14:
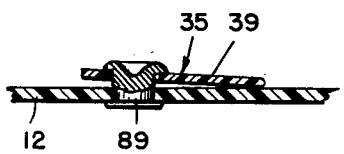
Fig. 14 is a view similar to Fig. 4 but showing a modified form of mounting.

In Fig. 14 I show a modified mounting for the pivoted end of the sound pickup member 35. In this view, 12 indicates the lower wall of the case and 39 designates the base or base end portion of the sound pickup member 35 previously described. In this form of the invention I eliminate the spring 45 and utilize a shorter rivet, indicated by 89, to secure the base. The rivet should be long enough to permit of the base being inclined somewhat as shown in Fig. 14, and in this connection it may be noted that the length of the rivet is a factor in determining the amount of pressure that the lever arm will exert against the diaphragm since, if the rivet is made too long, it will permit undue tilting of the sound pickup member with consequent less pressure of the lever arm against the diaphragm. The hole in the base portion 39 should of course be substantially oversized with respect to the rivet to permit the tilting relation of the parts.

Although I have illustrated and described a preferred form of my invention, I contemplate that various changes and modifications can be made therein without departing from the invention, the scope of which is indicated by the following claims.

I claim:

1. In a phonograph having a support, a phonograph record mounted for rotation on the support, and a sound diaphragm spaced from and substantially parallel to the record, mechanical sound pickup and amplification means, comprising a pickup member including a main arm adapted to be mounted at one end and free at the other, and a lever arm integral with and extending laterally from the free end of said main arm and terminating in an end portion in pressure engagement with the diaphragm, a needle firmly mounted in said pickup member at the free end of said main arm, means mounting said one end of the main arm of said pickup member on said support for pivotal movement of said pickup member in directions parallel with and angular to the plane of the record, and resilient means yieldable resisting pivotal movement of said pickup member in directions angular to the plane of the record, said pickup member being stressed between said record and diaphragm to an angularly tilted position relative to the plane of the record against the force of said resilient means.

2. In a phonograph having a support, a phonograph record mounted for rotation on the support, and a sound diaphragm spaced from the record, mechanical sound pickup and amplification means, comprising a pickup member including a main arm adapted to be mounted at one end and free at the other, and a lever arm integral with and extending laterally from the free end of said main arm and terminating in an end portion in pressure engagement with the diaphragm, a needle firmly mounted in said pickup member at the free end of said main arm, and means mounting said one end of the main arm of said pickup member on said support for pivotal movement of said pickup member in directions parallel with and angular to the plane of the record, said means comprising a laterally extending base on the end of the main arm positioned against said support and having a hole therethrough, a pin mounted on the support and extending through the hole in said base, said hole being substantially larger than the diameter of said pin, and a spring between said pin and said base urging said base against said support.

3. In a phonograph device, a sound record, a diaphragm member, support means supporting said record and diaphragm member in spaced opposed relationship, said record being movably mounted, a sound pickup member having a diaphragm-engaging portion slidably engaging said diaphragm member and an opposed record-engaging stylus portion slidably engaging said record, pivotal means supporting said pickup member for swinging movement in a plane parallel to the plane of the record and for limited tilting movement in planes angular to the plane of the record, said pickup member having a laterally extending portion adjacent said pivot means and thereby being fulcrumed against said support means adjacent said pivotal means, and resilient means yieldably resisting said tilting movement of said pickup member about its fulcrum; said pickup member being tiltably resiliently stressed between said diaphragm member and said record against the force of said resilient means whereby to cause said diaphragm-engaging portion and said stylus portion, respectively, to resiliently engage said diaphragm member and said record.

4. In a phonograph having a support, a record mounted on the support and a diaphragm mounted in spaced opposed relation to the record, a sound pickup member having a diaphragm-engaging portion and having a base remote from said diaphragm-engaging portion, means securing the base of said pickup member to said support for tilting movement in a plane angular to the plane of a record, means resisting tilting movement of said pickup member, and a needle mounted in said pickup member and opposed to said diaphragm-engaging portion spaced from said base and said diaphragm-engaging portion, the axis of said needle being inclined with relation to a line normal to the plane of the record when said pickup member is unrestrained, said pickup member, when installed, being stressed between said diaphragm and said record in a manner to tilt said pickup member against the force of the means resisting tilting movement thereof whereby to position said needle substantially vertically with respect to the plane of the record.

References Cited in the file of this patent

UNITED STATES PATENTS

| | | |
|---|---|---|
| 639,452 | Smallwood | Dec. 19, 1899 |
| 653,654 | Brown | July 17, 1900 |
| 708,049 | Jordan | Sept. 2, 1902 |
| 724,435 | Cheney | Apr. 7, 1903 |
| 1,080,013 | Landin | Dec. 2, 1913 |
| 1,323,317 | Repp | Dec. 2, 1919 |
| 1,506,562 | Button | Aug. 26, 1924 |
| 2,197,881 | Seabo | Apr. 23, 1940 |
| 2,236,275 | Rich | Mar. 25, 1941 |
| 2,236,599 | Hutter | Apr. 1, 1941 |
| 2,381,927 | Roberts | Aug. 14, 1945 |
| 2,499,343 | Raffles | Feb. 28, 1950 |
| 2,580,071 | Bunyard | Dec. 25, 1951 |
| 2,647,753 | Goldmark | Aug. 4, 1953 |

FOREIGN PATENTS

| | | |
|---|---|---|
| 24,784 | Great Britain | of 1914 |